United States Patent
Kuo et al.

(10) Patent No.: US 11,360,521 B2
(45) Date of Patent: Jun. 14, 2022

(54) NOTEBOOK COMPUTER

(71) Applicant: PEGATRON CORPORATION, Taipei (TW)

(72) Inventors: Chan-Wei Kuo, Taipei (TW); I-Tien Hsieh, Taipei (TW); Hui-Chen Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/347,023

(22) Filed: Jun. 14, 2021

(65) Prior Publication Data

US 2022/0050512 A1    Feb. 17, 2022

(30) Foreign Application Priority Data

Aug. 13, 2020   (TW) ................................ 109127598

(51) Int. Cl.
    *G06F 1/16*      (2006.01)

(52) U.S. Cl.
    CPC ................................ *G06F 1/1679* (2013.01)

(58) Field of Classification Search
    CPC ............... G06F 1/1616; G06F 1/1679; G06F 2200/1633; G06F 1/1654; G06F 1/1656; E05B 63/24; E05B 65/006; E05B 15/0053; E05B 65/0067; H05K 5/03; E05C 3/04

See application file for complete search history.

(56) References Cited

U.S. PATENT DOCUMENTS

| | | | | |
|---|---|---|---|---|
| 7,438,333 | B2 * | 10/2008 | Wu ....................... | G06F 1/1679 292/251.5 |
| 7,495,901 | B2 * | 2/2009 | Yun ....................... | E05C 3/162 361/679.55 |
| 8,009,424 | B2 * | 8/2011 | Zhu ....................... | E05B 15/101 361/679.58 |
| 8,085,533 | B2 * | 12/2011 | Zhao ..................... | E05B 65/006 361/679.55 |
| 8,172,282 | B2 * | 5/2012 | Lev ....................... | E05B 65/006 292/164 |
| 8,699,223 | B2 * | 4/2014 | Yu ......................... | G06F 1/1679 361/679.55 |
| 9,822,561 | B2 * | 11/2017 | Chiang ................. | E05C 19/06 |

(Continued)

FOREIGN PATENT DOCUMENTS

TW      200703749 A     1/2007
TW      201241600 A1     10/2012

*Primary Examiner* — Rockshana D Chowdhury
(74) *Attorney, Agent, or Firm* — Muncy, Geissler, Olds & Lowe, P.C.

(57) ABSTRACT

A notebook computer which includes a screen base, a keyboard base and a fastening structure is disclosed. The screen base includes a screen body slot, a first surface and a second surface. The screen body slot passes through the first surface and the second surface. The screen body slot includes two protrusion units. The keyboard base includes a hook, and the screen body is capable of rotating relative to the keyboard base. The fastening structure includes a fastener and a plurality of positioning units. The fastener includes a first fastening slot, a second fastening slot, a first side slot and a second side slot. Each protrusion unit is contained movably in the first side slot and the second side slot, respectively, such that the fastener is capable of moving in the screen body slot.

11 Claims, 10 Drawing Sheets

(56) References Cited

U.S. PATENT DOCUMENTS

| | | | |
|---|---|---|---|
| 11,237,591 B2* | 2/2022 | Urimoto | E05B 63/24 |
| 2008/0179894 A1* | 7/2008 | Chuang | E05C 3/06 |
| | | | 292/109 |
| 2012/0106065 A1* | 5/2012 | Yu | E05C 1/02 |
| | | | 292/96 |
| 2014/0312628 A1* | 10/2014 | Yuan | E05C 3/124 |
| | | | 292/99 |

* cited by examiner

NOTEBOOK COMPUTER

CROSS-REFERENCE TO RELATED APPLICATION

This application claims the priority benefit of Taiwan application serial no. 109127598, filed on Aug. 13, 2020. The entirety of the above-mentioned patent application is hereby incorporated by reference herein and made a part of this specification.

BACKGROUND

1. Technical Field

The present disclosure relates to a notebook computer, particularly to a notebook computer including the screen and the keyboard which can be combined in two ways.

2. Description of the Related Art

The two-in-one notebook computer on the market has a detachable screen and keyboard design. When the screen and keyboard are combined, they can be used as a common notebook computer by the user; when the screen and keyboard are separated, the screen can be used as a tablet computer. Because the two-in-one notebook computer can become a notebook computer or a tablet computer according to the different usage scenarios, the two-in-one notebook computer is welcome for the customer.

However, in the combination of the screen and the keyboard of the prior art, the screen can only be locked with the keyboard by the hook while the display side of the screen faces towards and contacts the keyboard. However, the hook cannot be used to combine the screen with the keyboard in such a way that the display side of the screen faces away from the keyboard (namely the other side different to the display side of the screen contacts the keyboard).

SUMMARY

It is an object of the present disclosure to provide a notebook computer including the screen and the keyboard in two way combinations.

To achieve the abovementioned object, a notebook computer of the present disclosure includes a screen base, a keyboard base and a fastening structure. The screen base includes a screen body slot, a first surface and a second surface opposite to the first surface. The screen body slot passes through the first surface and the second surface. The screen body slot includes two protrusion units. The keyboard base includes a hook, and the screen body is capable of rotating relative to the keyboard base. The fastening structure includes a fastener and a plurality of positioning units. The screen base and the keyboard base are fastened by the fastener when the screen base and the keyboard are folded and the first surface or the second surface faces the keyboard base. The fastener includes a first fastening slot, a second fastening slot, a first side slot and a second side slot. The two protrusion units are movably disposed in the first side slot and the second side slot, respectively, such that the fastener is capable of moving in the screen body slot. When the screen base and the keyboard are folded and the first surface faces the keyboard base, the fastener is capable of moving in the screen body slot to lock the hook to the first fastening slot. When the screen base and the keyboard are folded and the second surface faces the keyboard base, the fastener is capable of moving in the screen body slot to lock the hook to the second fastening slot. The plurality of positioning units are used for allowing the fastener to be positioned in the screen body slot when the screen base rotates to open relative to the keyboard base.

According to one embodiment of the present disclosure, the fastener further includes at least one channel, and the plurality of positioning units are located in the at least one channel.

According to one embodiment of the present disclosure, wherein one end of each of the plurality of positioning units is connected to the screen base and the other end of each of the plurality of positioning units is connected to the fastener.

According to one embodiment of the present disclosure, the hook includes a pressing unit; when the pressing unit is pressed to move the hook, the hook is separated from the fastener to change a fastened state to a release state.

According to one embodiment of the present disclosure, the plurality of positioning units are located on two opposite sides of the fastener, and the two protrusion units contact the plurality of positioning units to fasten to the plurality of positioning units.

According to one embodiment of the present disclosure, each of the two protrusion units includes a plurality of fastening points, and the plurality of positioning units selectively fasten to the plurality of fastening points of the two protrusion units.

According to one embodiment of the present disclosure, wherein each of the plurality of positioning units includes a protruded block and a spring; one end of the spring is connected to the protruded block.

According to one embodiment of the present disclosure, the hook includes a pressing unit; when the pressing unit is pressed to move the hook, the hook is separated from the fastener to change a fastened state to a release state.

According to one embodiment of the present disclosure, the keyboard base includes a keyboard base slot and a pivot unit, the hook and the pivot unit are disposed at the keyboard base slot, and the pivot unit is pivotally connected to the hook.

According to one embodiment of the present disclosure, the keyboard base includes a keyboard base slot and an elastic unit, the hook and the elastic unit are disposed at the keyboard base slot, and the elastic unit is connected to the hook.

According to one embodiment of the present disclosure, the first side slot and the second side slot are located at two opposite sides of the fastener, respectively.

DETAILED DESCRIPTION OF THE PREFERRED EMBODIMENT

Figure 1:
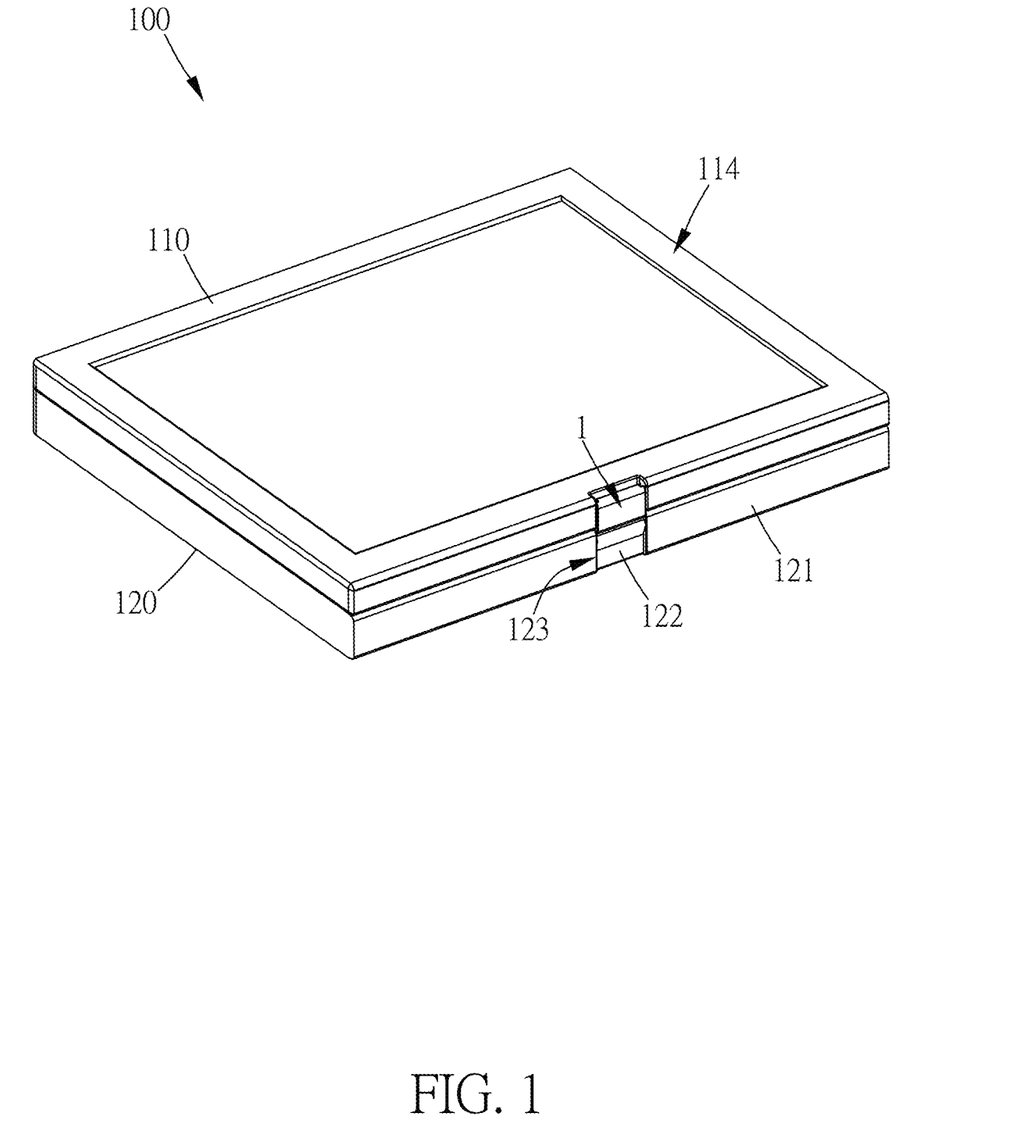
FIG. 1 illustrates a schematic drawing of the second surface of the screen base facing up and facing away from the keyboard base in the first embodiment of the notebook computer of the present disclosure.
Figure 2:
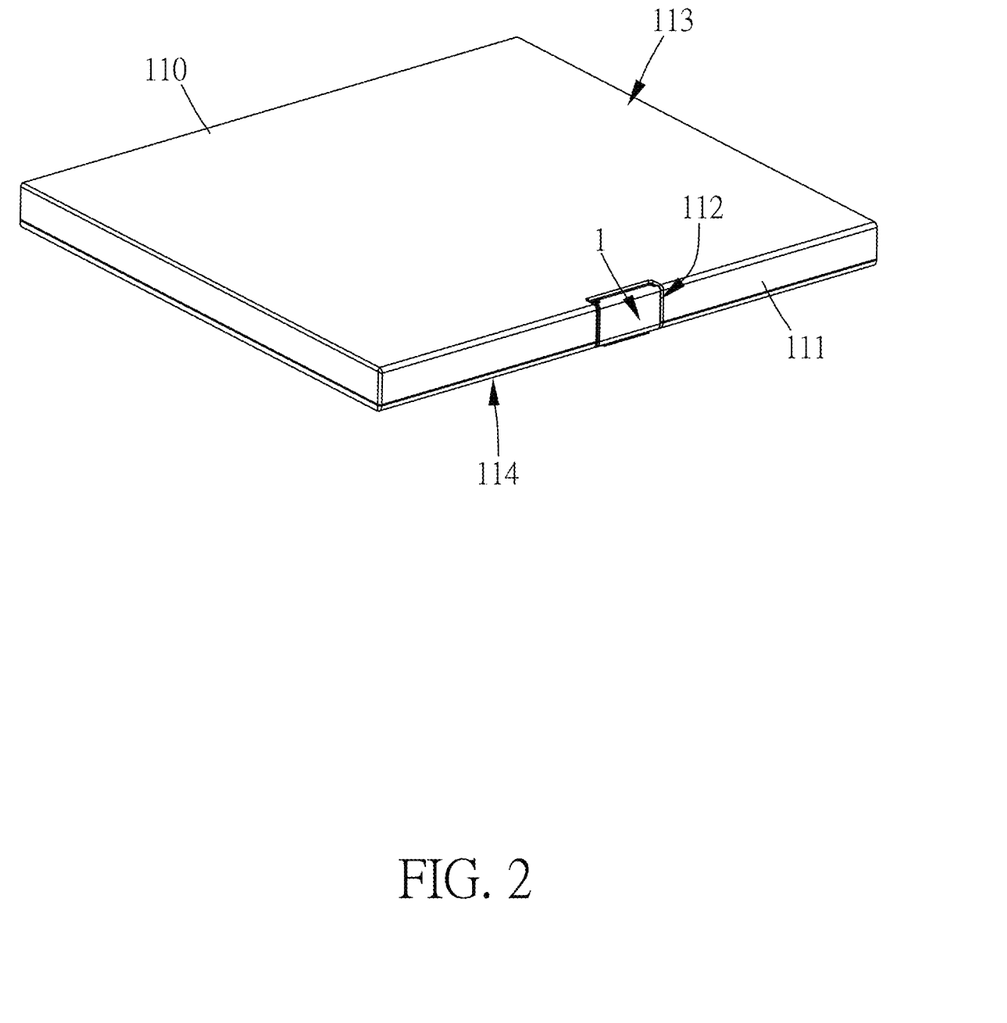
FIG. 2 illustrates a schematic drawing of the first surface of the screen base facing up in the first embodiment of the present disclosure.
Figure 3:
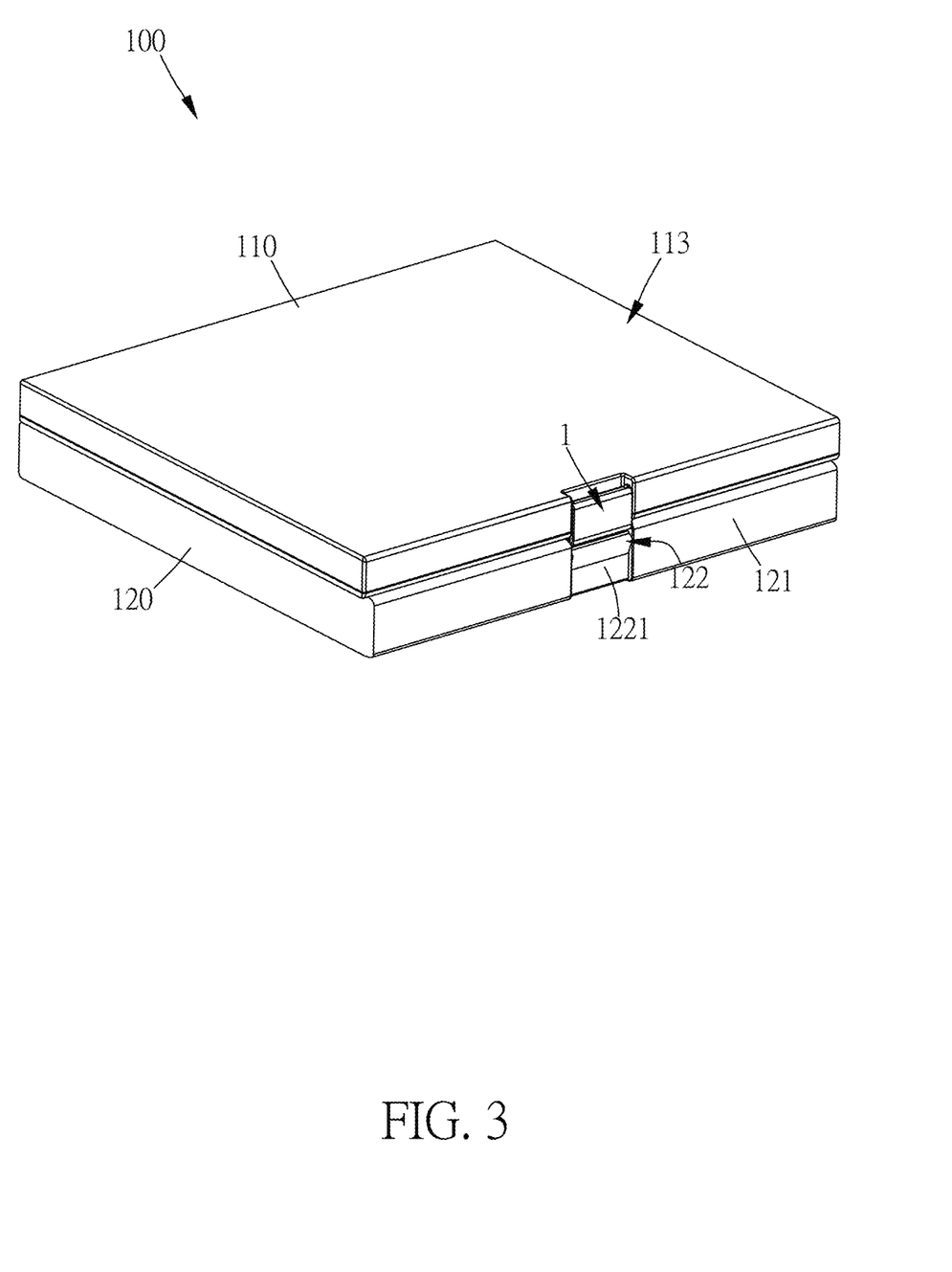
FIG. 3 illustrates a schematic drawing of the first surface of the screen base facing up and facing away from the keyboard base in the first embodiment of the notebook computer of the present disclosure.
Figure 4:
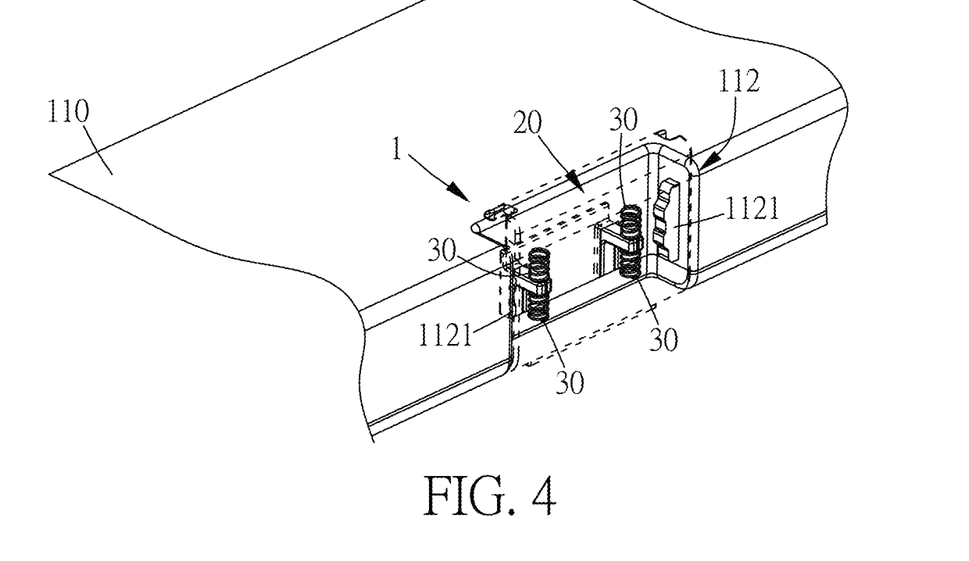
FIG. 4 illustrates a schematic drawing of the fastening structure on the screen base in the first embodiment of the present disclosure.
Figure 5:
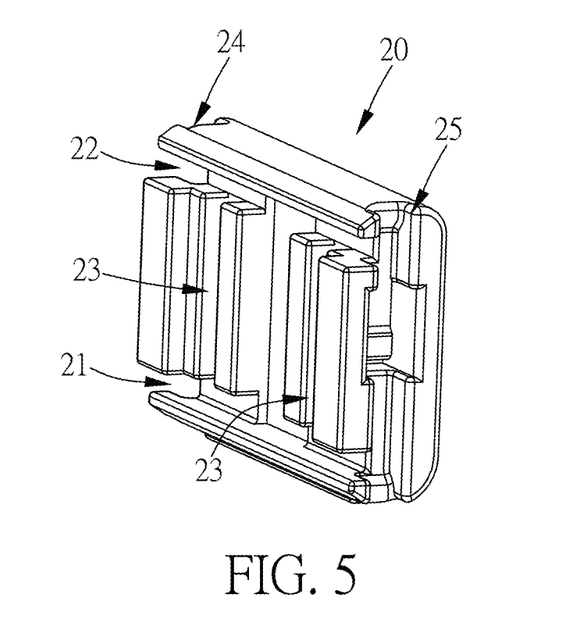
FIG. 5 illustrates a schematic drawing of the back of the fastening structure in the first embodiment of the present disclosure.
Figure 6A:
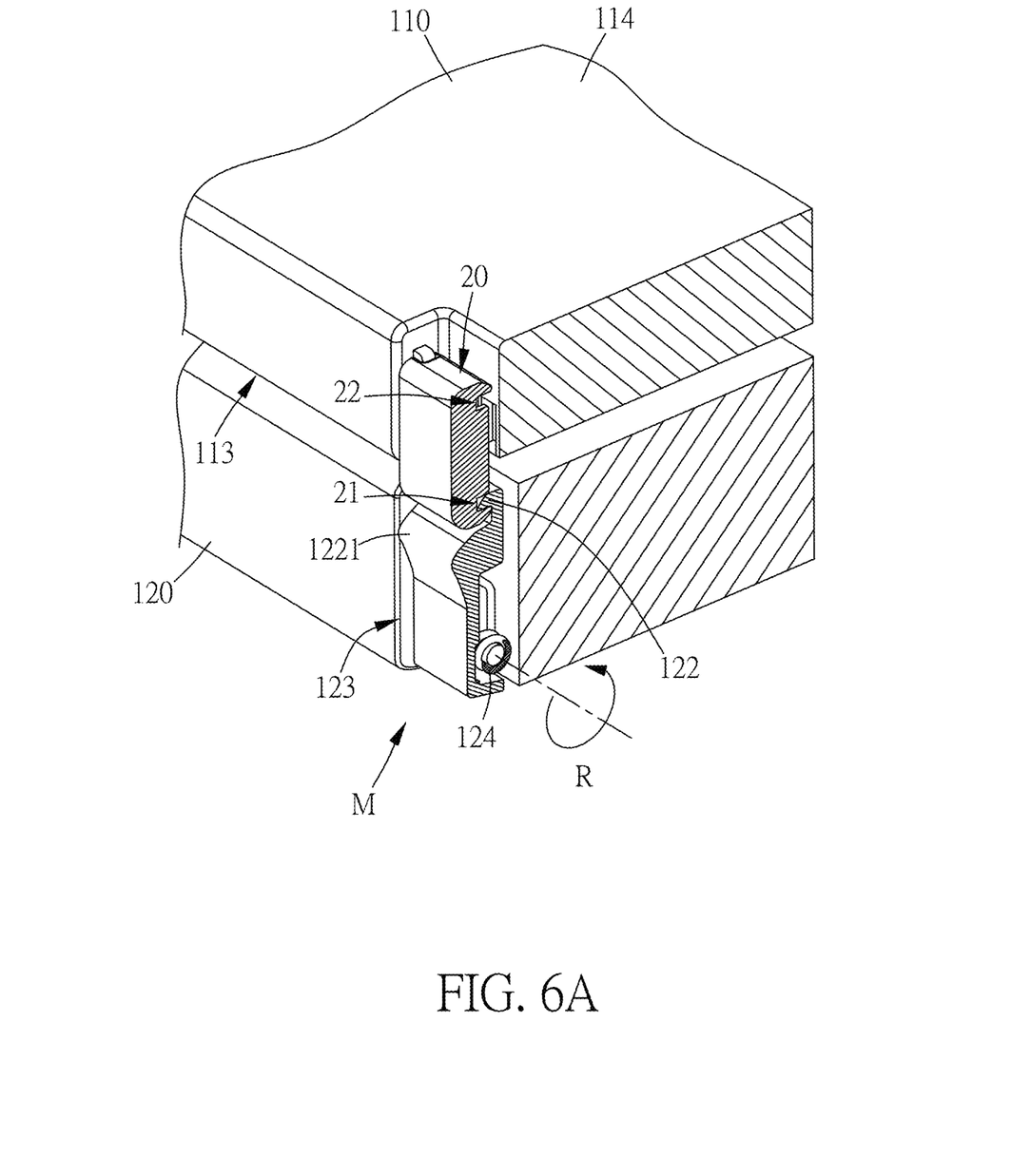
FIG. 6A illustrates a schematic drawing of the first fastening slot of the fastener and the hook in the fastened state in the first embodiment of the present disclosure.
Figure 6B:
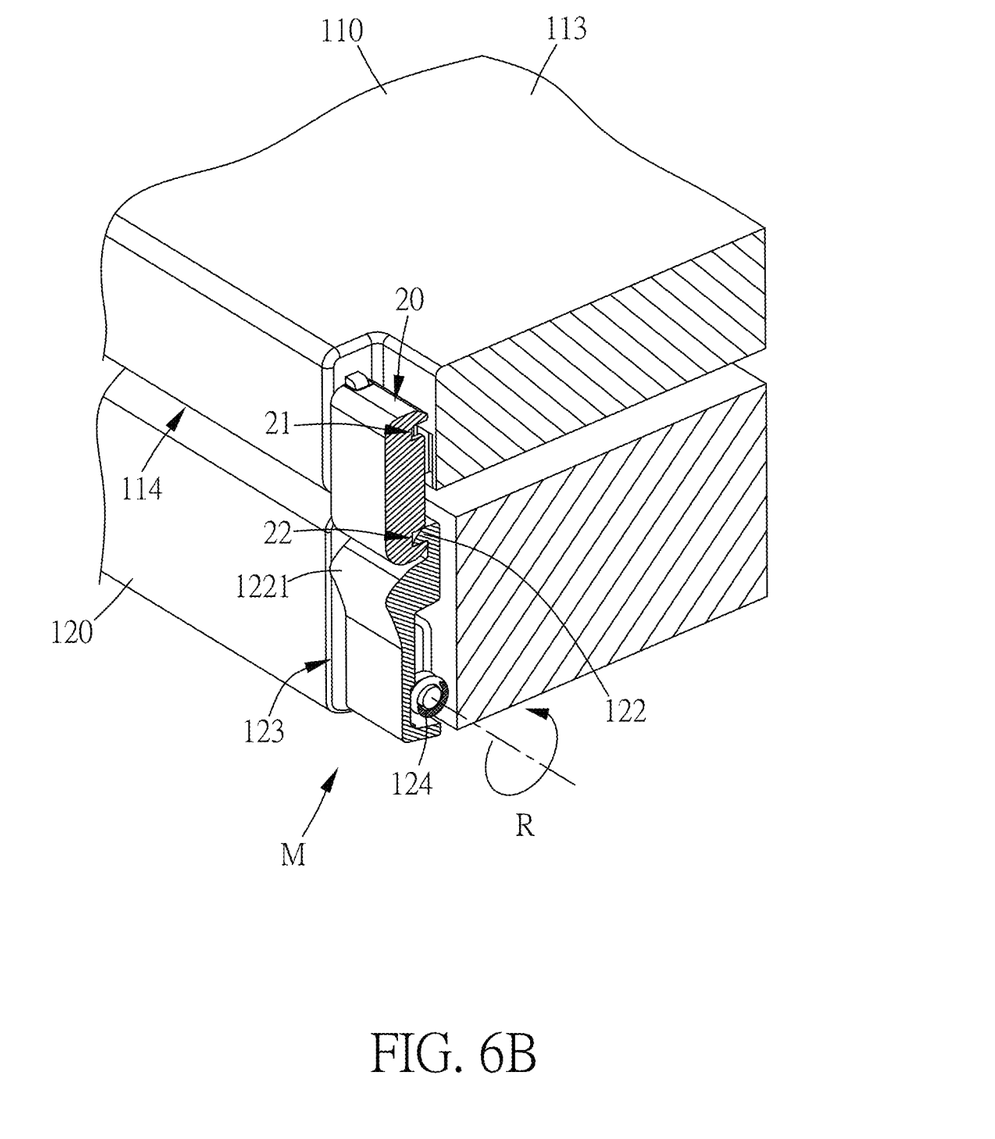
FIG. 6B illustrates a schematic drawing of the second fastening slot of the fastener and the hook in the fastened state in the first embodiment of the present disclosure.

Please refer to FIG. 1 to FIG. 6B, which illustrate the notebook computer and the fastening structure in the first embodiment of the present disclosure. FIG. 1 illustrates a schematic drawing of the second surface of the screen base depicting the second surface facing up and facing away from the keyboard base in the first embodiment of the notebook computer of the present disclosure. FIG. 2 illustrates a schematic drawing of the first surface of the screen base depicting the first surface facing up in the first embodiment of the present disclosure. FIG. 3 illustrates a schematic drawing of the first surface of the screen base facing up and facing away from the keyboard base in the first embodiment of the notebook computer of the present disclosure. FIG. 4 illustrates a schematic drawing of the fastening structure on the screen base in the first embodiment of the present disclosure. FIG. 5 illustrates a schematic drawing of the back of the fastening structure in the first embodiment of the present disclosure. FIG. 6A illustrates a schematic drawing of the first fastening slot of the fastener and the hook in the fastened state in the first embodiment of the present disclosure. FIG. 6B illustrates a schematic drawing of the second fastening slot of the fastener and the hook in the fastened state in the first embodiment of the present disclosure.

As shown in FIG. 1 to FIG. 4 and FIG. 6A, in the first embodiment of the present disclosure, the notebook computer 100 can be a convertible tablet computer, or a computer with a screen which can be rotated 180 degrees relative to the keyboard, such that the screen and the keyboard can be combined in two ways. The notebook computer 100 includes a screen base 110, a keyboard base 120 and a fastening structure 1. The screen base 110 is capable of rotating relative to the keyboard base 120. The screen base 110 includes a screen, an edge 111, a screen body slot 112, a first surface 113 and a second surface 114. The edge 111 is the side of the screen base 110. The screen body slot 112 is a groove, and the screen body slot 112 is located on the edge 111 and passes through the first surface 113 and the second surface 114. The screen body slot 112 includes two protrusion units 1121, and the two protrusion units 1121 are located on two opposite side of the screen body slot 112, respectively. For example, the two protrusion units 1121 are located on the left side and right side of the screen body slot 112, respectively. It should be noted that the amount of the protrusion units 1121 is not limited to two, and the amount of the protrusion units 1121 can be changed according to the design requirement to be any number greater than one. The second surface 114 are opposite to the first surface 113. The first surface 113 is the surface facing away from the screen, and the second surface 114 is the surface having the screen. The keyboard base 120 includes a keyboard set, a side surface 121, a hook 122, a keyboard base slot 123 and a pivot unit 124. The side surface 121 is the side of the keyboard base 120. The keyboard base slot 123 is a groove. The hook 122 is located on the side surface 121 and in the keyboard base slot 123. The hook 122 may include a pressing unit 1221, and the pressing unit 1221 is used for allowing the user to press to move the hook 122. The pivot unit 124 is located in the keyboard base slot 123. The pivot unit 124 may be a torsion spring. The pivot unit 124 is pivotally connected to the hook 122. Because the hook 122 and the pivot unit 124 are both located in the groove of the keyboard base slot 123, they will not protrude from the side surface 121.

As shown in FIG. 2 and FIG. 4, in the first embodiment of the present disclosure, the fastening structure 1 is located in the groove of the screen body slot 112, so the fastening structure 1 will not protrude from the edge 111. The fastening structure 1 is used for fastening to the hook 122. Via the fastening between the fastening structure 1 and the hook 122, the screen base 110 can be folded to the keyboard base 120 with either the first surface 113 or the second surface 114 facing the keyboard base 120. Since the fastening structure 1 does not protrude from the edge 111, it can be avoided that the fastening structure 1 fastening the screen base 110 to the keyboard base 120 in the two ways protrudes from the chassis. The fastening structure 1 includes a fastener 20 and a plurality of positioning units 30.

As shown in FIG. 4 and FIG. 5, in the first embodiment of the present disclosure, the fastener 20 can be pushed by the finger of the user to move to the position where the hook 122 can be fastened. The fastener 20 is used for fastening the screen base 110 and the keyboard base 120 when the screen base 110 and the keyboard base 120 are folded and the first surface 113 or the second surface 114 faces the keyboard base 120. The fastener 20 may include a first fastening slot 21, a second fastening slot 22, two channels 23, a first side slot 24 and a second side slot 25. The first fastening slot 21 and the second fastening slot 22 are located on the two corresponding sides of the fastener 20, and one of the first fastening slot 21 and the second fastening slot 22 can fasten to the hook 122. The two channels 23 are used for containing the plurality of positioning units 30. It should be noted that the amount of the channels 23 is not limited to two, and the amount of the channels 23 can be changed to be any number greater than one according to the design requirement. The first side slot 24 and the second side slot 25 are located at the two opposite sides of the fastener 20, respectively. For example, the first side slot 24 and the second side slot 25 are located at the left side and the right side of the fastener 20, respectively. The two protrusion units 1121 are movably contained in the first side slot 24 and the second side slot 25, respectively, such that the fastener 20 is capable of moving in the screen body slot 112. When the screen base 110 and the keyboard base 120 are folded and the first surface 113 of the screen base 110 faces the keyboard base 120, the fastener 20 is capable moving in the screen body slot 112 to lock the hook 122 to the first fastening slot 21. When the screen base 110 and the keyboard base 120 are folded and the second surface 114 of the screen base 110 faces the keyboard base 120, the fastener 20 is capable of moving in the screen body slot 112 to lock the hook 122 to the second fastening slot 22.

As shown in FIG. 4 to FIG. 6A, in the first embodiment of the present disclosure, the plurality of positioning units 30 can be four springs, and the plurality of positioning units 30 are located in the two channels 23. One end of each of the positioning units 30 is connected to the screen base 110, and the other end of each of the positioning units 30 is connected to the fastener 20. Specifically, two positioning units 30 may be connected to the upper side of the fastener 20, and another two positioning units 30 may be connected to the lower side of the fastener 20. The plurality of positioning units 30 are used for pushing the fastener 20 along the extending direction of the channel 23 such that the fastener 20 can be positioned in the screen body slot 112 when the screen base 110 is opened relative to the keyboard base 120.

As shown in FIG. 1 and FIG. 2, in the first embodiment of the present disclosure, if the user wants to fasten the screen base 110 and the keyboard base 120 under the situation that the screen base 110 and the keyboard base 120 are folded and the first surface 113 of the screen base 110 faces the keyboard base 120, as shown in FIG. 4 to FIG. 6A, the user can use a hand to press the pressing unit 1221 to cause the hook 122 to move along the opposite direction of the rotation direction R to avoid blocking the fastener 20 from moving downward. Then, the user can use a hand to push the fastener 20 to cause the fastener 20 to move towards the first surface 113 in the screen body slot 112 and to align the first fastening slot 21 with the hook 122, and then, the user's hand can release the pressing unit 1221. At this moment, the torsion spring of the pivot unit 124 will rotate along the rotation direction R such that the hook 122 enters the first fastening slot 21. Finally, the user's hand can release the fastener 20, and at this moment, the elastic force of the plurality of positioning units 30 will pull the fastener 20 upward. Because the hook 122 has already entered the first fastening slot 21, the pivot unit 124 will still apply the force to the hook 122 along the rotation direction R, so the elastic force of the plurality of positioning units 30 and the torsion force of the pivot unit 124 will be balanced such that the fastener 20 will be positioned and the first fastening slot 21 of the fastener 20 will fasten to the hook 122. The screen base 110 and the keyboard base 120 can be combined with each other via the first fastening slot 21 and the hook 122 fasten with each other, such that the first surface 113 of the screen base 110 faces towards the keyboard base 120.

As shown in FIG. 1 to FIG. 3, in the first embodiment of the present disclosure, if the user wants to fasten the screen base 110 and the keyboard base 120 under the situation that the screen base 110 and the keyboard base 120 are folded and the second surface 114 of the screen base 110 faces keyboard base 120, as shown in FIG. 4 to FIG. 5 and FIG. 6B, the user can use a hand to press the pressing unit 1221 to cause the hook 122 to move along the opposite direction of the rotation direction R to prevent blocking the fastener 20 from moving downward. Then, the user can use a hand to push the fastener 20 to cause the fastener 20 to move towards the second surface 114 in the screen body slot 112 to align the second fastening slot 22 with the hook 122, and the user's hand can release the pressing unit 1221. At this moment, the torsion spring of the pivot unit 124 will rotate along the rotation direction R such that the hook 122 enters the second fastening slot 22. Finally, the user's hand can release the fastener 20, and the elastic force of the plurality of positioning units 30 will pull the fastener 20 upward. Because the hook 122 has already entered the second fastening slot 22, the pivot unit 124 can still apply force to the hook 122 along the rotation direction R, so the pulling force of the plurality of positioning units 30 and the torsion force of the pivot unit 124 will be balanced such that the fastener 20 will be positioned and the second fastening slot 22 of the fastener 20 will be fastened to the hook 122. Via the second fastening slot 22 and the hook 122 fasten with each other, the screen base 110 and the keyboard base 120 can be combined with each other such that the second surface 114 of the screen base 110 faces towards the keyboard base 120.

If the user wants to separate the locked and combined screen base 110 and the keyboard base 120, the user can press the pressing unit 1221 to move the hook 122 along the opposite direction of the rotation direction R. Therefore, the hook 122 and the fastener 20 will be separated from the fastened state to the release state, such that the user can separate the screen base 110 and the keyboard base 120 easily.

Figure 7:
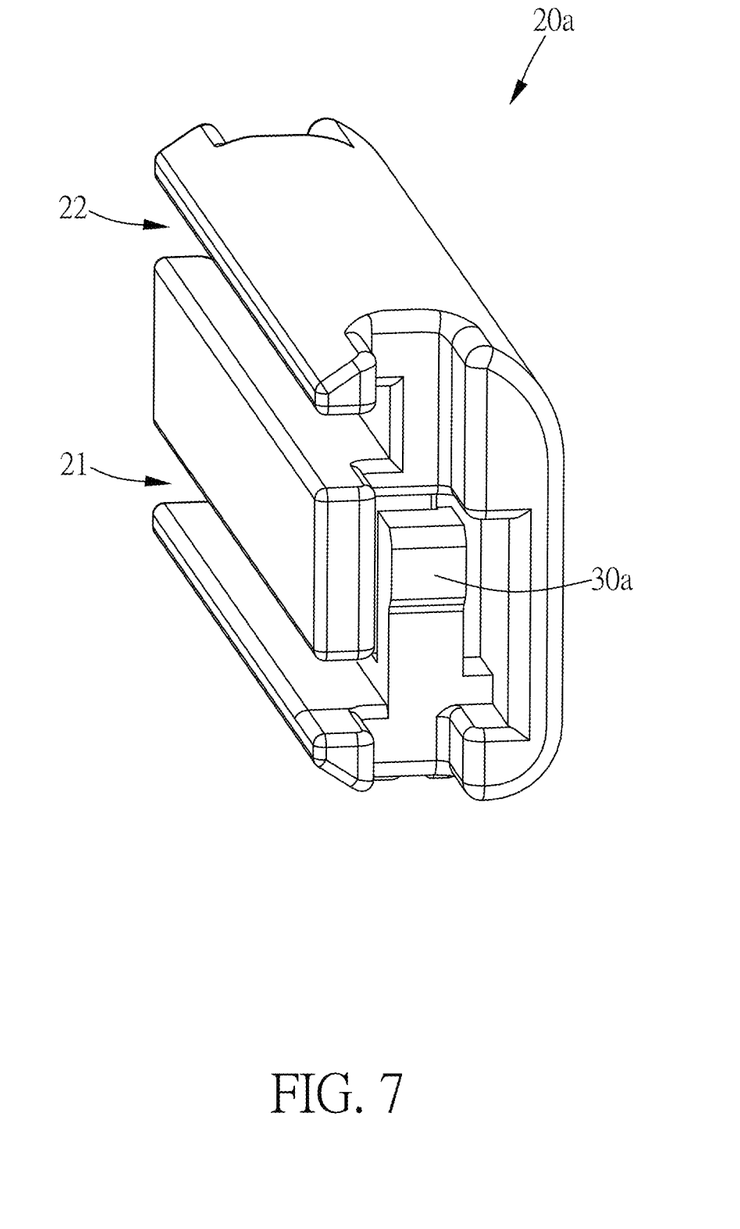
FIG. 7 illustrates a schematic drawing of the fastening structure in the second embodiment of the present disclosure.
Figure 8A:
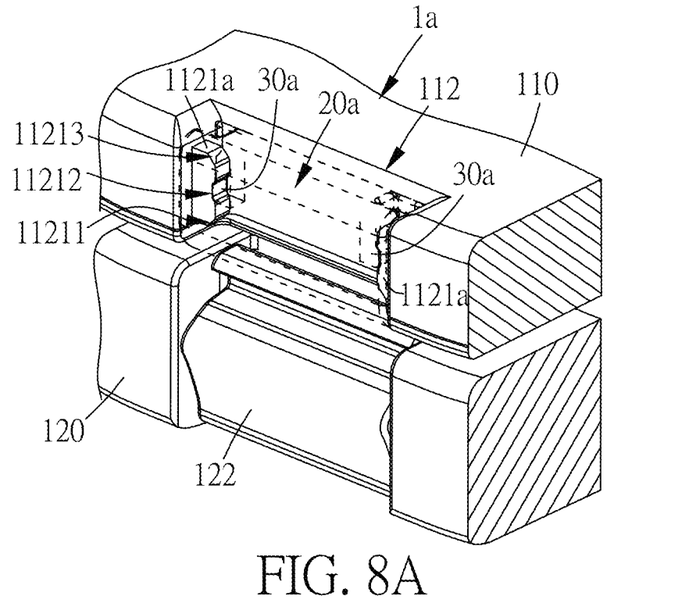
FIG. 8A illustrates a schematic drawing of the fastener and the hook in the release state in the second embodiment of the present disclosure.
Figure 8B:
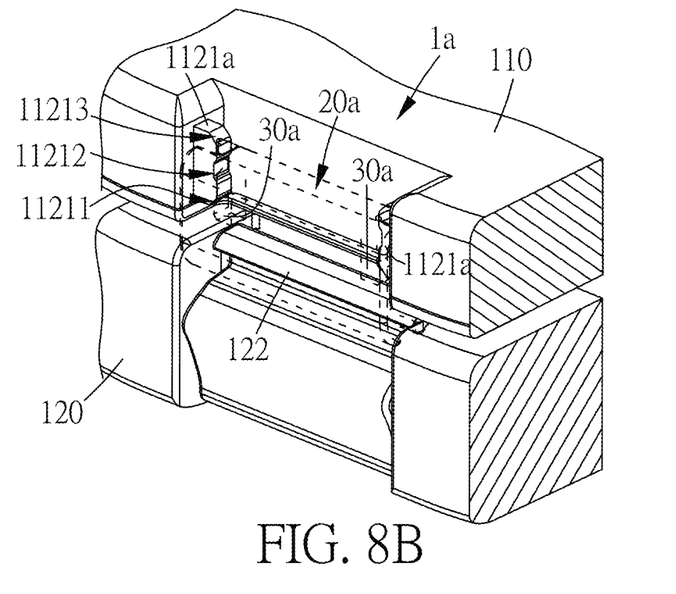
FIG. 8B illustrates a schematic drawing of the fastener and the hook in the fastened state in the second embodiment of the present disclosure.

Please refer to FIG. 7 to FIG. 8B, which illustrate the fastening structure in the second embodiment of the present disclosure. FIG. 7 illustrates a schematic drawing of the fastening structure in the second embodiment of the present disclosure. FIG. 8A illustrates a schematic drawing of the fastener and the hook in the release state in the second embodiment of the present disclosure. FIG. 8B illustrates a schematic drawing of the fastener and the hook in the fastened state in the second embodiment of the present disclosure.

As shown in FIG. 7 to FIG. 8B, the difference between the second embodiment and the first embodiment is that, in the fastening structure 1a of the second embodiment, each of the protrusion units 1121a further includes a plurality of fastening points 11211, 11212, 11213, and the fastening points 11211, 11212, 11213 all have curved edges. The fastener 20a does not include the channel for containing the spring. The plurality of positioning units 30a are the protruding points located on two opposite sides of the fastener 20a. For example, the plurality of positioning units 30a are located on the left and right sides of the fastener 20a. The plurality of positioning units 30a all have curved edges. The two protrusion units 1121a connect with and contact the plurality of positioning units 30a, and the protruding points of the plurality of positioning units 30a can be selectively fastened to the plurality of fastening points 11211, 11212, 11213. The user can apply force to the fastener 20a according to the requirement to move the fastener 20a upward or downward. Via the positioning unit 30a on the two sides of the fastener 20a and the fastening points 11211, 11212, 11213 fastened with each other, the fastener 20a can be positioned at different specific heights.

As shown in FIG. 8A and FIG. 8B, if the user wants to fasten the screen base 110 and the keyboard base 120, the user can put the screen base 110 on the keyboard base 120 and use a hand to press the hook 122 to prevent the hook 122 from blocking the fastener 20a from moving downward.

Then, the user can apply force to move the fastener 20a downward such that the curved edges of the protruding points of the pushing positioning unit 30a can release the curved edges of the fastening point 11212 to separate each other and can move downward to fasten to the fastening point 11211, and the user's hand can release the hook 122. At this moment, the pivot unit causes the hook 122 to enter the fastening groove of the fastener 20a. Therefore, the hook 122 and the fastener 20a can be fastened together. Via the fastener 20a and the hook 122 fastened each other, the screen base 110 and the keyboard base 120 can be combined stably.

Figure 9A:
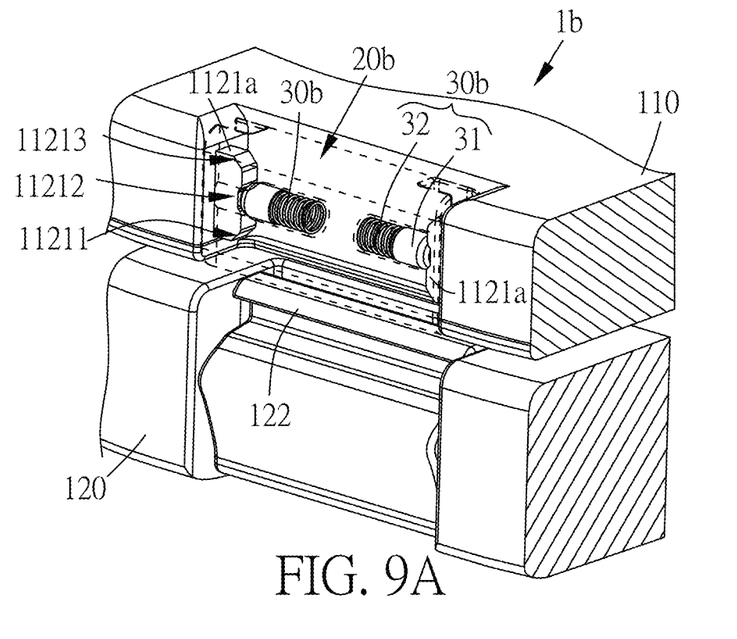
FIG. 9A illustrates a schematic drawing of the fastener and the hook in the release state in the third embodiment of the present disclosure.
Figure 9B:
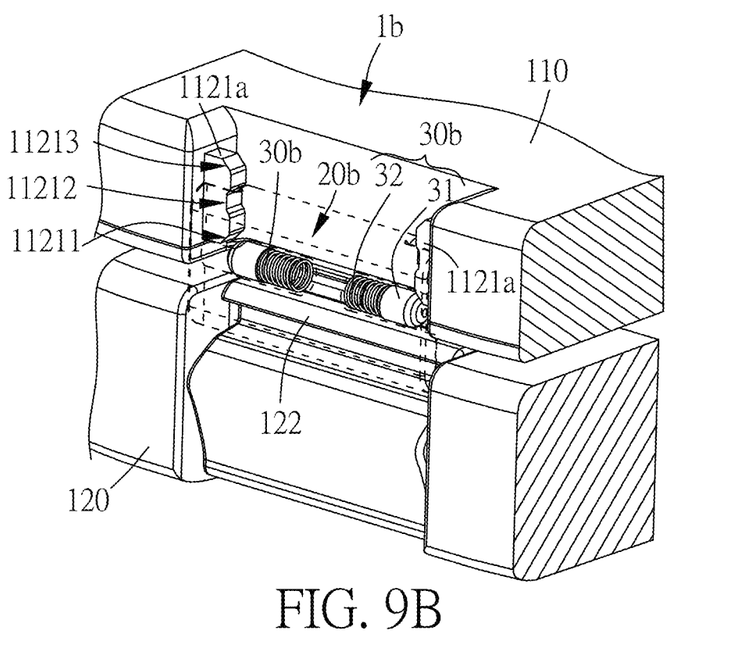
FIG. 9B illustrates a schematic drawing of the fastener and the hook in the fastened state in the third embodiment of the present disclosure.

Please refer to FIG. 9A to FIG. 9B, which illustrate the fastening structure in the third embodiment of the present disclosure. FIG. 9A illustrates a schematic drawing of the fastener and the hook in the release state in the third embodiment of the present disclosure. FIG. 9B illustrates a schematic drawing of the fastener and the hook in the fastened state in the third embodiment of the present disclosure As shown in FIG. 9A to FIG. 9B, the difference between the third embodiment and the second embodiment is that, in the fastening structure 1b of the third embodiment, the plurality of positioning units 30b are the spring base located at the fastener 20b, and each of the positioning units 30b may include a protruded block 31 and a spring 32. One end of each spring 32 is connected to the protruded block 31. The plurality of positioning units 30b are placed horizontally and respectively contact the two protrusion units 1121a, and the elastic force of the springs 32 causes the protruded blocks 31 to fasten to the fastening points 11211, 11212, 11213 with a corresponding height. The user can apply force to the fastener 20b according to the requirement to cause the fastener 20b to move upward or downward, and the spring of the positioning unit 30a which is pushed can be compressed and separated from the curved edges of the contacting fastening point to move to fasten to another fastening point. Via the positioning unit 30b located at the fastener 20b and the fastening points 11211, 11212, 11213 fastened each other, the fastener 20b can be positioned at a specific height.

Figure 10A:
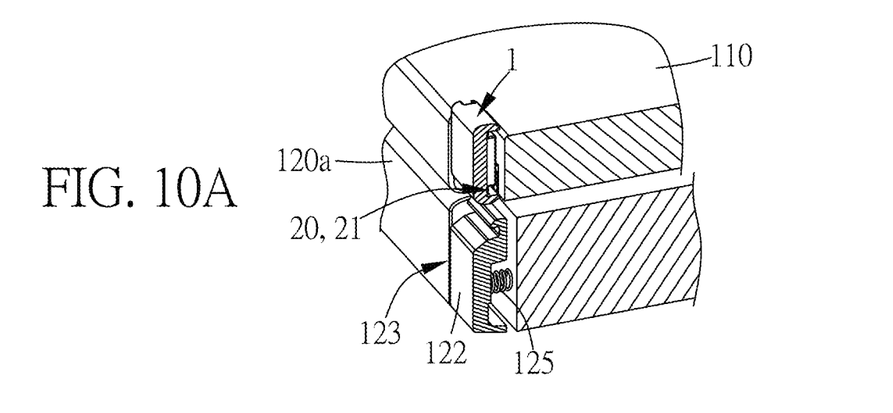
FIG. 10A illustrates a schematic drawing of the fastener and the hook in the release state in the fourth embodiment of the present disclosure.
Figure 10B:
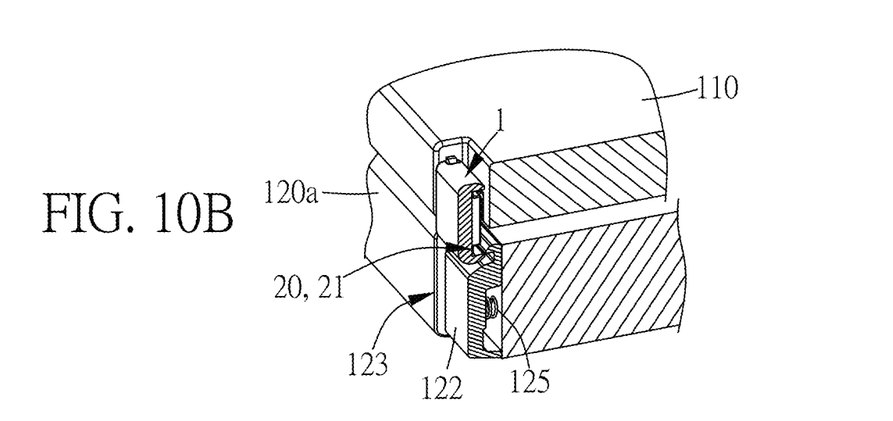
FIG. 10B illustrates a schematic drawing of the fastener having been moved close to the hook in the fourth embodiment of the present disclosure.
Figure 10C:
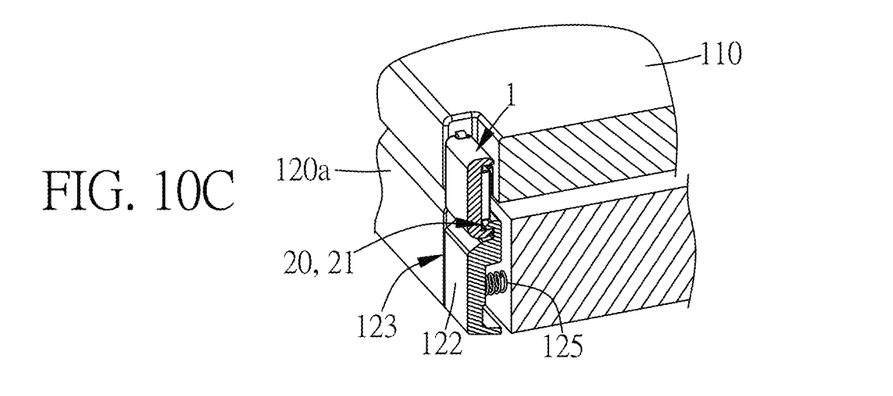
FIG. 10C illustrates a schematic drawing of the fastener and the hook in the fastened state in the fourth embodiment of the present disclosure.

Please refer to FIG. 10A to FIG. 10C, which illustrate the fastening structure in the fourth embodiment of the present disclosure. FIG. 10A illustrates a schematic drawing of the fastener and the hook in the release state in the fourth embodiment of the present disclosure. FIG. 10B illustrates a schematic drawing of the fastener having been moved close to the hook in the fourth embodiment of the present disclosure. FIG. 10C illustrates a schematic drawing of the fastener and the hook in the fastened state in the fourth embodiment of the present disclosure.

As shown in FIG. 10A to FIG. 10C, the difference between the fourth embodiment and the first embodiment is that, in the keyboard base 120a of the fourth embodiment, the keyboard base 120a does not include the pivot unit, and the keyboard base 120a further includes an elastic unit 125. The elastic unit 125 may be a spring, the spring is located in the keyboard base slot 123, and the elastic unit 125 is connected to the hook 122. The elastic unit 125 is used for pushing the hook 122 outward such that the hook 122 can fasten to the first fastening slot 21 of the fastener 20 of the fastening structure 1.

As shown in FIG. 10A, if the user wants to fasten the screen base 110 and the keyboard base 120a, the user can put the screen base 110 on the keyboard base 120a and use a hand to press the hook 122 to prevent the hook 122 from blocking the fastener 20 to move downward. As shown in FIG. 10B, the user can apply force to move the fastener 20 downward to cause the first fastening slot 21 to move to be aligned with the hook 122, and the user's hand can release the hook 122. At this moment, the elastic unit 125 will push the hook 122 outward. Therefore, the hook 122 which moves outward can be fastened to the first fastening slot 21 of the fastener 20. Via the fastener 20 and the hook 122 fastened each other, the screen base 110 and the keyboard base 120 can be combined stably.

Via the design of the fastening structure of the notebook computer in the present disclosure, the screen and the keyboard of the notebook computer can be combined in two ways. Since the fastening structure does not protrude from the edge, it can be avoided that the fastening structure fastening the screen base 110 to the keyboard base 120 in the two ways protrudes from the chassis. Therefore, the safety can be enhanced, and the screen of the notebook computer can face in different directions when installed to enhance the user's convenience.

What is claimed is:

1. A notebook computer, comprising:
   a screen base, comprising a screen body slot, a first surface and a second surface opposite to the first surface, wherein the screen body slot is through the first surface and the second surface, and the screen body slot comprises two protrusion units;
   a keyboard base, comprising a hook, wherein the screen base is capable of rotating relative to the keyboard base; and
   a fastening structure, comprising:
      a fastener, wherein the screen base and the keyboard base are fastened by the fastener when the screen base and the keyboard are folded and the first surface or the second surface faces the keyboard base, the fastener comprises a first fastening slot, a second fastening slot, a first side slot and a second side slot, and the two protrusion units are movably disposed in the first side slot and the second side slot, respectively, such that the fastener is capable of moving in the screen body slot; when the screen base and the keyboard are folded and the first surface faces the keyboard base, the fastener is capable of moving in the screen body slot to lock the hook to the first fastening slot; when the screen base and the keyboard are folded and the second surface faces the keyboard base, the fastener is capable of moving in the screen body slot to lock the hook to the second fastening slot; and
      a plurality of positioning units, for allowing the fastener to be positioned in the screen body slot when the screen base rotates to open relative to the keyboard base.

2. The notebook computer as claimed in claim 1, wherein the fastener further comprises at least one channel, and the plurality of positioning units are located in the at least one channel.

3. The notebook computer as claimed in claim 2, wherein one end of each of the plurality of positioning units is connected to the screen base and the other end of each of the plurality of positioning units is connected to the fastener.

4. The notebook computer as claimed in claim 2, wherein the hook comprises a pressing unit; when the pressing unit is pressed to move the hook, the hook is separated from the fastener to change a fastened state to a release state.

5. The notebook computer as claimed in claim 1, wherein the plurality of positioning units are located on two opposite sides of the fastener, and the two protrusion units contact the plurality of positioning units to fasten to the plurality of positioning units.

6. The notebook computer as claimed in claim 5, wherein each of the two protrusion units comprises a plurality of fastening points, and the plurality of positioning units selectively fasten to the plurality of fastening points of the two protrusion units.

7. The notebook computer as claimed in claim 6, wherein each of the plurality of positioning units comprises a protruded block and a spring, one end of the spring is connected to the protruded block.

8. The notebook computer as claimed in claim 6, wherein the hook comprises a pressing unit; when the pressing unit is pressed to move the hook, the hook is separated from the fastener to change a fastened state to a release state.

9. The notebook computer as claimed in claim 8, wherein the keyboard base comprises a keyboard base slot and a pivot unit, the hook and the pivot unit are disposed at the keyboard base slot, and the pivot unit is pivotally connected to the hook.

10. The notebook computer as claimed in claim 1, wherein the keyboard base comprises a keyboard base slot and an elastic unit, the hook and the elastic unit are disposed at the keyboard base slot, and the elastic unit is connected to the hook.

11. The notebook computer as claimed in claim 1, wherein the first side slot and the second side slot are located at two opposite sides of the fastener, respectively.

\* \* \* \* \*